(12) United States Patent
Larsen

(10) Patent No.: US 10,582,664 B2
(45) Date of Patent: Mar. 10, 2020

(54) AGRICULTURAL MACHINE HAVING A PLANT PROCESSING APPARATUS

(71) Applicant: Kverneland Group Kerteminde A/S, Kerteminde (DK)

(72) Inventor: Uffe Larsen, Odense SØ (DK)

(73) Assignee: Kverneland Group Kerteminde A/S, Kerteminde (DK)

( * ) Notice: Subject to any disclaimer, the term of this patent is extended or adjusted under 35 U.S.C. 154(b) by 0 days.

(21) Appl. No.: 15/549,562

(22) PCT Filed: Feb. 9, 2016

(86) PCT No.: PCT/EP2016/052686
§ 371 (c)(1),
(2) Date: Aug. 8, 2017

(87) PCT Pub. No.: WO2016/128378
PCT Pub. Date: Aug. 18, 2016

(65) Prior Publication Data
US 2018/0027735 A1 Feb. 1, 2018

(30) Foreign Application Priority Data

Feb. 10, 2015 (GB) .................................. 1502201.5

(51) Int. Cl.
*A01D 82/02* (2006.01)
*A01D 43/10* (2006.01)
(Continued)

(52) U.S. Cl.
CPC ........... *A01D 82/02* (2013.01); *A01D 43/063* (2013.01); *A01D 43/10* (2013.01); *A01F 15/10* (2013.01)

(58) Field of Classification Search
CPC .......... A01F 12/18; A01F 12/26; A01F 12/22; A01F 12/24; A01F 12/28; A01F 7/067;
(Continued)

(56) References Cited

U.S. PATENT DOCUMENTS 2,771,077 A * 11/1956 Karlsson ................. A01F 12/18
29/896.6
3,101,721 A * 8/1963 Fuller .................... A01F 12/185
460/109
(Continued)

FOREIGN PATENT DOCUMENTS

CN 202206753 U 5/2012
DE 2131134 A1 3/1972
(Continued)

OTHER PUBLICATIONS

International Search Report and Written Opinion for Application No. PCT/EP2016/052686, dated May 4, 2016.
(Continued)

*Primary Examiner* — Arpad Fabian-Kovacs
(74) *Attorney, Agent, or Firm* — Knobbe, Martens, Olson & Bear, LLP

(57) ABSTRACT

An agricultural machine can include a plant processing apparatus for processing plant material. The plant processing apparatus includes a cylindrical drum rotatable about a drum axis, a rotary drive for rotating the drum about the drum axis, and a curved shell that extends around at least part of the circumference of the drum. The plant processing apparatus includes a processing channel provided between an outer surface of the cylindrical drum and an inner surface of the shell. The processing channel has an inlet end and an outlet end. Plant material is transported through the processing channel from the inlet end to the outlet end by rotation of the cylindrical drum. The drum and the shell each have
(Continued)

sets of working elements that together process the plant material as it is fed through the processing channel.

24 Claims, 13 Drawing Sheets

(51) Int. Cl.
*A01D 43/063* (2006.01)
*A01F 15/10* (2006.01)

(58) Field of Classification Search
CPC ........ A01F 12/182; A01F 12/20; A01F 12/52; A01F 15/04; A01F 7/062; A01D 41/00; A01D 82/00; A01D 82/02; A01D 43/10
See application file for complete search history.

(56) References Cited

U.S. PATENT DOCUMENTS

| | | | | |
|---|---|---|---|---|
| 3,896,608 | A * | 7/1975 | Garrott | G01V 3/08 460/2 |
| 3,935,866 | A * | 2/1976 | Northup | A01D 41/1273 460/4 |
| 3,945,178 | A * | 3/1976 | Delfosse | A01D 61/008 56/14.6 |
| 4,117,849 | A * | 10/1978 | Pakosh | A01D 41/00 460/66 |
| 4,275,546 | A * | 6/1981 | Bohman | A01D 75/187 460/2 |
| 4,310,950 | A * | 1/1982 | Cox | D01B 1/02 19/202 |
| 4,378,024 | A * | 3/1983 | De Busscher | A01F 12/442 460/73 |
| 4,490,964 | A * | 1/1985 | Eldredge | A01D 41/1273 460/5 |
| 4,663,921 | A * | 5/1987 | Hagstrom | A01D 41/14 460/16 |
| 4,846,198 | A * | 7/1989 | Carnewal | A01D 41/00 460/21 |
| 4,915,671 | A * | 4/1990 | Johnson | A01F 12/187 209/282 |
| 5,743,795 | A * | 4/1998 | Kersting | A01F 12/28 460/109 |
| 5,894,716 | A | 4/1999 | Haldeman et al. | |
| 6,074,297 | A * | 6/2000 | Kuchar | A01F 12/20 460/46 |
| 6,190,252 | B1 * | 2/2001 | Makeeff | A01F 7/06 460/68 |
| 6,346,067 | B1 * | 2/2002 | Walters | A01D 82/02 492/30 |
| 6,494,782 | B1 * | 12/2002 | Strong | A01D 41/1271 460/71 |
| 6,719,225 | B1 | 4/2004 | Hesch | |
| 7,337,599 | B2 | 3/2008 | Wilhelm | |
| 7,654,892 | B2 * | 2/2010 | Pope | A01F 12/52 460/13 |
| 8,133,101 | B2 * | 3/2012 | Regier | A01F 12/181 460/109 |
| 2007/0026913 | A1 * | 2/2007 | Kuchar | A01F 12/22 460/112 |
| 2011/0143827 | A1 * | 6/2011 | Flickinger | A01F 12/24 460/110 |
| 2012/0216499 | A1 | 8/2012 | Patterson et al. | |
| 2013/0086879 | A1 * | 4/2013 | Laumeier | A01D 82/00 56/16.4 A |
| 2013/0305678 | A1 * | 11/2013 | Clauss | A01D 43/10 56/16.4 C |
| 2014/0097160 | A1 * | 4/2014 | Flickinger | B23K 26/38 219/121.44 |
| 2014/0194170 | A1 * | 7/2014 | Holtmann | A01F 12/26 460/108 |
| 2014/0308998 | A1 * | 10/2014 | Bergkamp | A01F 12/28 460/107 |
| 2017/0000031 | A1 * | 1/2017 | Horning, Jr. | B02C 4/30 |
| 2017/0150678 | A1 * | 6/2017 | Li | A01D 34/04 |
| 2017/0202148 | A1 * | 7/2017 | Fink | A01D 41/06 |
| 2017/0290263 | A1 * | 10/2017 | Kemmner | A01D 41/127 |

FOREIGN PATENT DOCUMENTS

| | | | |
|---|---|---|---|
| EP | 0164489 B1 | 11/1989 | |
| EP | 0516894 A1 * | 12/1992 | ............ A01F 12/26 |
| GB | 2075816 A | 11/1981 | |
| GB | 2089635 A | 6/1982 | |
| RU | 2245612 C1 * | 2/2005 | ............ A01F 12/18 |
| RU | 2287307 C1 * | 11/2006 | ............ A23N 4/00 |
| WO | WO 88/07812 A1 | 10/1988 | |
| WO | WO 2013/067119 A1 | 5/2013 | |

OTHER PUBLICATIONS

United Kingdom Search Report for Application No. GB1502201.5, dated Aug. 7, 2015.

* cited by examiner

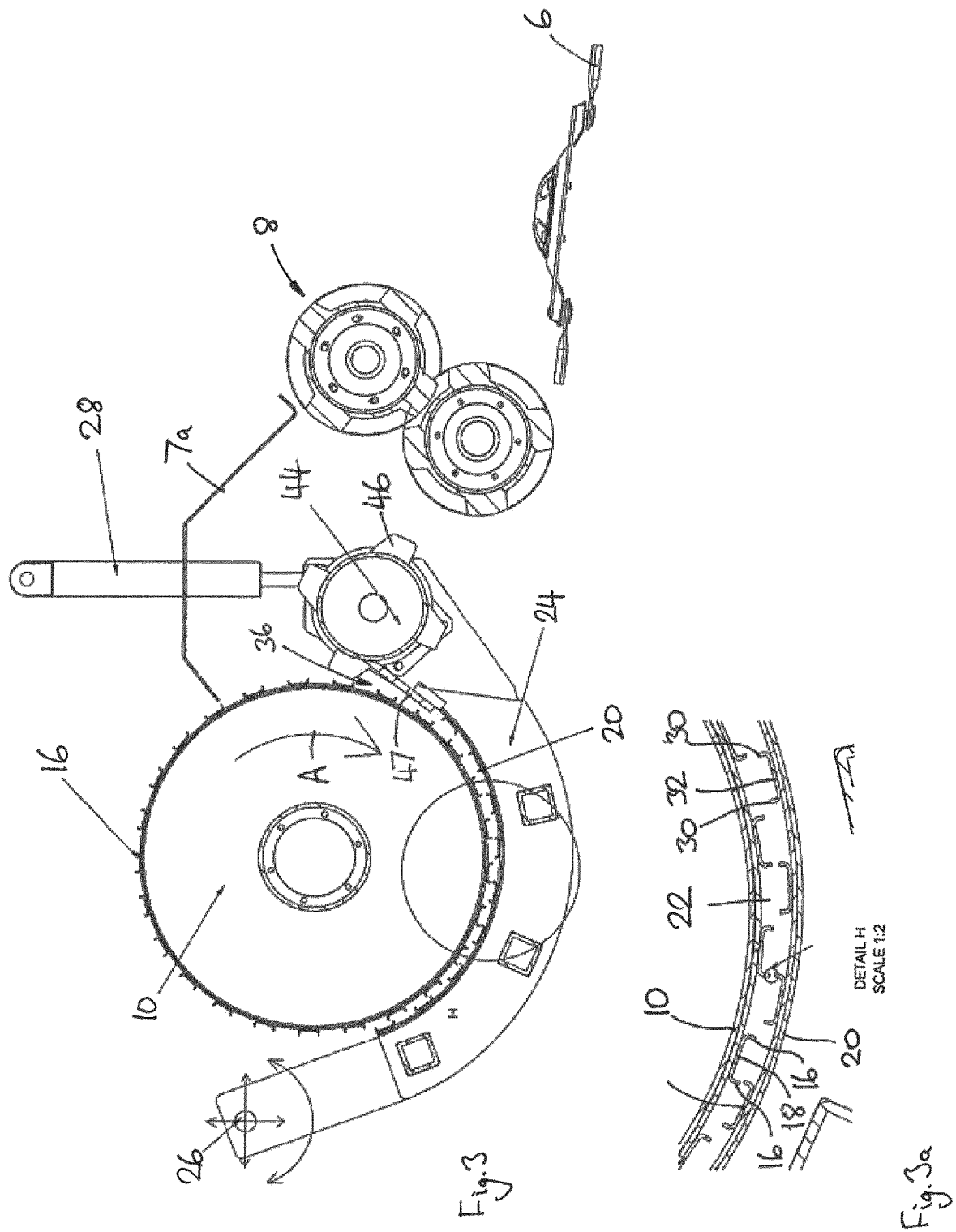

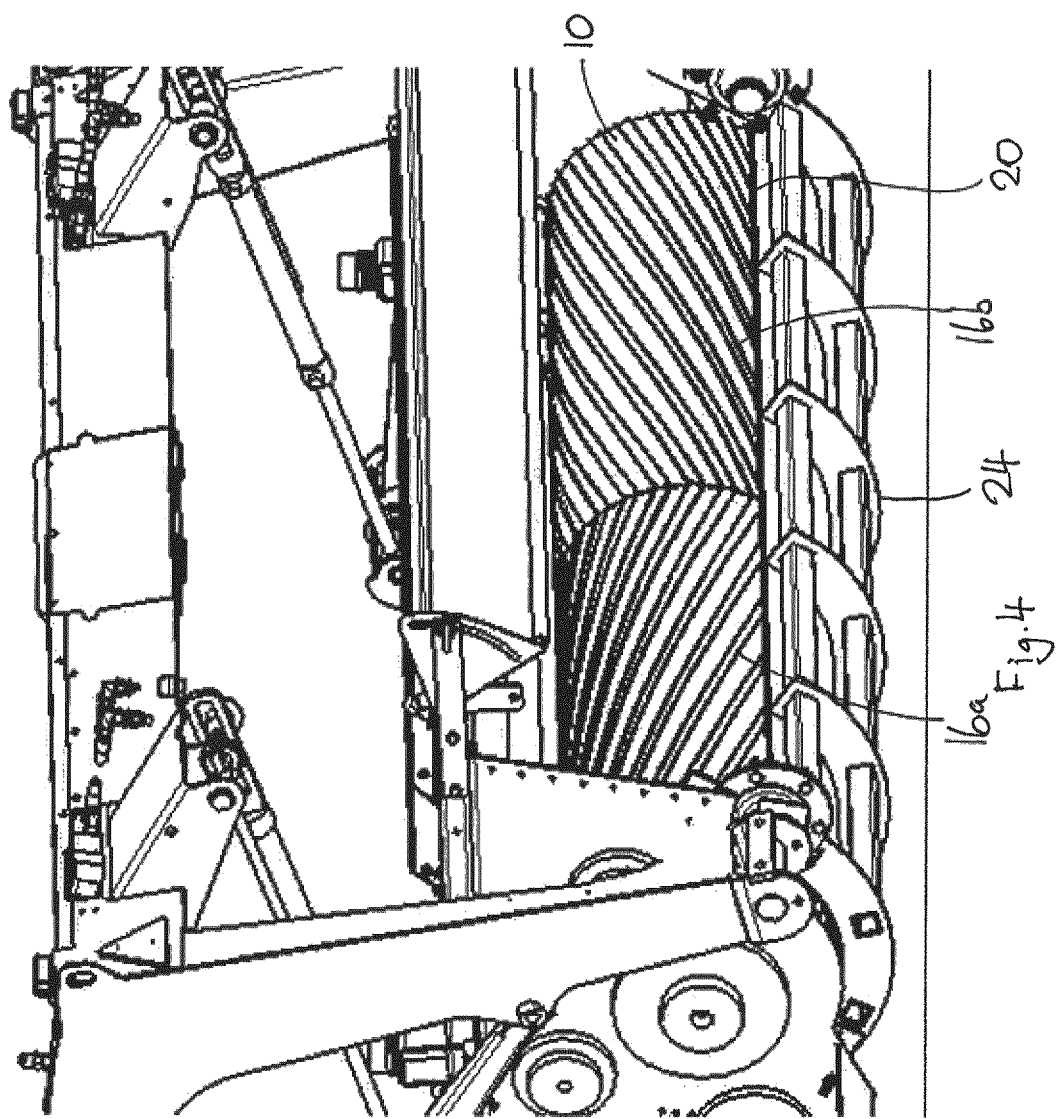

AGRICULTURAL MACHINE HAVING A PLANT PROCESSING APPARATUS

CROSS REFERENCE

This application is a U.S. National Phase of PCT International Application No. PCT/EP2016/052686, filed Feb. 9, 2016 and published as WO 2016/128378 on Aug. 18, 2016, which claims priority to U.K. Application No. 1502201.5, filed Feb. 10, 2015. The entire disclosure of each of the above-identified applications is hereby incorporated by reference.

BACKGROUND

Field

The present disclosure relates to an agricultural machine that includes a plant processing apparatus for processing plant material, for example grasses and similar agricultural material, to improve the biodegradability of the plant material and make it more useful as a biomass material for the production of biofuel, e.g. biogas, or alternatively to improve the digestibility of the plant material when it is to be used as a feed for cows and other animals.

Certain Related Art

Header devices for harvesting and conditioning biomass crops are described, for example, in U.S. Patent Application Publication No. 2012/0216499 A1 and International Patent Application Publication No. WO2013/067119 A1. The header devices both include a conditioning device comprising a pair of counter-rotating rollers having outwardly-extending flutes that bend the crop material as it passes through the nip between the rollers.

SUMMARY

Grasses (graminoids) and similar plant materials are potentially useful sources of biofuel as they can be grown quickly and easily on cultivated land and also in meadows and marginal areas, for example highlands, where other plants may grow less successfully. The grasses that grow in locations such as roadside verges are also potentially useful biomass materials, but the cut grasses are normally either composted or treated as general municipal waste.

Mature grasses can be harvested and used to generate biofuel, for example by a process of anaerobic biodegradation. However, the usefulness of grasses as a source of biofuel is limited by the presence of lignin in the cell wall, which reduces access of biodegradation enzymes to the other cell wall components, particularly cellulose and hemicellulose.

The biodegradability of grasses and similar plant materials can be enhanced in a number of different ways, including acid or alkali treatment, treating with ammonia and urea, fungal treatment, steam explosion and physical grinding and milling. The present disclosure is concerned particularly with physical treatment of the plant material by a process termed herein "excoriation", which involves breaking the lignin structure of the grass straw to provide enzyme access to the cellulose and hemicellulose materials, but without completely breaking up the straw structure of the grass, which would make further handling and collection of the grass more difficult. The previously mentioned conditioning devices of Application Publication Nos. US2012/0216499 and WO2013/067119 are ineffective with grasses and similar crops as they do not sufficiently break the lignin of the plant material.

It is an object of the present disclosure to provide an agricultural machine that includes a plant processing apparatus for processing plant material, for example grasses and similar agricultural material, to improve the biodegradability of the plant material and make it more useful as a biomass material for the production of biofuel, e.g. biogas, or alternatively to improve the digestibility of the plant material when it is to be used as a feed for cows and other animals.

The term "agricultural machine" as used herein means primarily a machine that is used for processing plant material in situ, for example as crops are harvested, or during gathering and loading of the harvested crop material. However, the term "agricultural machine" is also intended to encompass machines that are used for processing plant material after harvesting and either before or during feeding of the processed plant material to animals. Usually, an agricultural machine will be mobile, allowing it to be moved to the location of the crop material in the field. However, it may also be stationary. In some cases the agricultural machine may be configured to process the plant material while carrying out some other operation. For example, the agricultural machine may include or be associated with a harvesting mechanism for harvesting the crop material and be configured to process the plant material as it is harvested, or it may include a baler for baling the processed plant material, or it may comprise a loader wagon that gathers, processes and loads the harvested plant material.

According to one aspect of the disclosure there is provided an agricultural machine that includes a plant processing apparatus for processing plant material to improve the biodegradability or the digestibility of the plant material, the plant processing apparatus comprising a cylindrical drum that is rotatable about a drum axis, a rotary drive for rotating the drum about the drum axis, and a curved shell that extends around at least part of the circumference of the drum, wherein a processing channel is provided between an outer surface of the cylindrical drum and an inner surface of the curved shell, said processing channel having an inlet end and an outlet end, whereby in use plant material is transported through the processing channel from the inlet end to the outlet end by rotation of the cylindrical drum, wherein the drum has on its outer surface a first set of working elements and the shell has on its inner surface a second set of working elements, said first and second sets of working elements being configured to process the plant material as it is fed through the processing channel.

The plant processing apparatus, alternatively referred to herein as an excoriation apparatus, is configured to process plant material, for example grass and similar agricultural material, to improve the biodegradability of the plant material and make it more useful as a biomass material for the production of biofuel, or to improve the digestibility of the plant material so that it can be used as a feed for cows and other animals.

As the plant material, e.g. cut grass, is fed through the processing channel it is subjected to intense mechanical working by the working elements as they pass over one another. The straws of the plant material are both squeezed and pulled apart by the working elements as they are dragged through the processing channel between the drum and the shell. This breaks the lignin of the plant material, so that in a subsequent anaerobic biodegradation process the biodegradation enzymes are able to access the cellulose and hemicellulose materials within the plant material, thus enabling the efficient production of biofuel and improving the digestibility of the plant material when used as a feed. The gap between the respective sets of working elements is carefully controlled to minimise chopping of the stalks into small pieces, to avoid creating problems with subsequent collection and handling of the processed plant material.

Advantageously, the width of the processing channel (in the radial direction relative to the axis of the drum) decreases from the inlet end to the outlet end. This ensures that the plant material undergoes an increasing level of mechanical working by the working elements as it passes through the processing channel from the inlet end to the outlet end. Preferably, the width decreases from about 10 cm at the inlet end to about 0 cm at the outlet end, where the tips of the working elements are pressed against each other in the absence of plant material in the processing channel. Alternatively, a mechanical stop may be provided to prevent the tips of the working elements from coming into contact. This mechanical stop may be adjustable to control the minimum width of the processing channel.

When plant material is present in the processing channel, the plant material may push the shell away from the drum against a pressing force, whereby the width of the channel may increase slightly to allow the plant material to pass between the tips of the working elements as it is pulled through the processing channel.

In some preferred embodiments, the shell is partially cylindrical and the cylindrical surfaces of the drum and the shell are non-coaxial, whereby the width of the processing channel decreases from the inlet end to the outlet end. The axes of the cylindrical surfaces of the drum and the shell are preferably substantially parallel to one another. Alternatively, the shell may have another curved shape, or it may have a pseudo-curved shape (for example, it may consist of a plurality of planar elements set at different angles).

Advantageously, the drum has a first effective radius R1 where R1 is in the range 30-100 cm, preferably 40-60 cm. If the shell is cylindrical it preferably has a second effective radius R2 where R2 is greater than R1. Typically, R2−R1 is in the range 0-20 cm, preferably 5-15 cm.

Advantageously, the relative positions of the shell and the drum are adjustable, to enable the degree of working to be adjusted, and/or to optimise the apparatus for different plant materials. Preferably, the shell is mounted on a suspension system that permits the shell to move towards and away from the drum in response to the flow of plant material through the excoriation apparatus. The suspension system is preferably adjustable to permit the position of the shell to be adjusted radially and/or tangentially relative to the drum axis, allowing the size and shape of the processing channel to be changed. The suspension system is preferably configured to permit pivoting movement of the shell about a pivot point that is located towards the outlet end of the shell, so that the movement of the shell at the outlet end is less than the movement at the inlet end. Alternatively, the pivot point may be located towards the inlet end of the shell, so that the movement of the shell is greater at the outlet end than the inlet end of the processing channel. The pressure exerted on the plant material may be greater when the pivot point is moved closer to the inlet end.

The plant processing apparatus preferably includes a pressing mechanism for pressing the drum and the shell towards one another. The pressing mechanism preferably includes an adjustment mechanism for adjusting a pressing force. The adjustment mechanism may include an actuator, for example a hydraulic actuator or a mechanical actuator.

Advantageously, the first set of working elements comprises a set of ribs that extend outwards from the cylindrical surface of the drum. Advantageously, the second set of working elements comprise ribs that extend inwards from the curved surface of the shell.

The first set of ribs is preferably arranged helically on the surface of the drum, preferably with a helix angle in the range 0° to 35°. The second set of ribs is preferably arranged helically on the surface of the shell, preferably with a helix angle in the range 0° to 35°. The first and second sets of ribs therefore each have a relatively shallow helix angle, which corresponds to a large pitch. In the event that the helix angle is 0° the ribs will be straight and parallel to the longitudinal axis of the drum/shell.

The first and second sets of working elements are preferably set at different helix angles, so that the two sets of ribs cross over one another. This provides a "nip" at each point where the ribs cross over where the pressure applied to the plant material is very high, and produces an effect similar to a carding effect on the plant material. The nip where the working elements cross moves along the length of the ribs as the drum rotates thereby processing the plant material over the whole length of the ribs. The helical working elements also make it possible to draw the plant material inwards towards the center of the drum to form a swath.

Advantageously, the shell includes an inlet portion adjacent the inlet end that has no working elements, allowing plant material to be fed more easily into the processing channel. This makes it easier to guide the plant material into the processing channel. The shell may also have an outlet portion adjacent the outlet end that has no working elements, allowing the processed plant material to leave the processing channel more easily. As a result, the speed at which the plant material passes through the processing channel may increase in the outlet portion, almost to the peripheral speed of the drum. This makes it possible to form the material into a swath or to spread the plant material widely using guide plates.

The drum may include drive elements that extend radially outwards beyond the working elements, and optionally the shell may include a plurality of slots that accommodate the drive elements during rotation of the drum. The drive elements help to gather the plant material and feed it into the processing channel.

The plant processing apparatus may include at least one feed roller that feeds or forces plant material into the processing channel.

The plant processing apparatus may include a trap device located adjacent the inlet end of the processing channel for separating rocks and other unwanted debris from the plant material before it is fed into the processing channel.

In an embodiment, the agricultural machine includes a harvesting mechanism for harvesting a plant material and feeding the plant material to the apparatus for processing plant material.

Advantageously, the harvesting mechanism includes a plurality of rotating cutters. Preferably, the harvesting mechanism includes a feed mechanism for feeding the cut plant material to the plant processing apparatus for processing plant material.

In another embodiment, the agricultural machine includes a baler for baling the processed plant material.

In another embodiment, the agricultural machine includes a loader for loading the processed plant material, for example into a transportation wagon.

BRIEF DESCRIPTION OF THE DRAWINGS

Certain embodiments of the disclosure will now be described by way of example with reference to the accompanying drawings, in which:

FIG. 3 is a side view of an agricultural machine that includes an excoriation apparatus according to a second embodiment;

FIG. 3a is a side view showing a portion of the agricultural machine shown in FIG. 3 at an enlarged scale;

FIG. 4 is an isometric view of the agricultural machine shown in FIG. 1, seen from the rear;

DETAILED DESCRIPTION OF CERTAIN EMBODIMENTS

Figure 1:
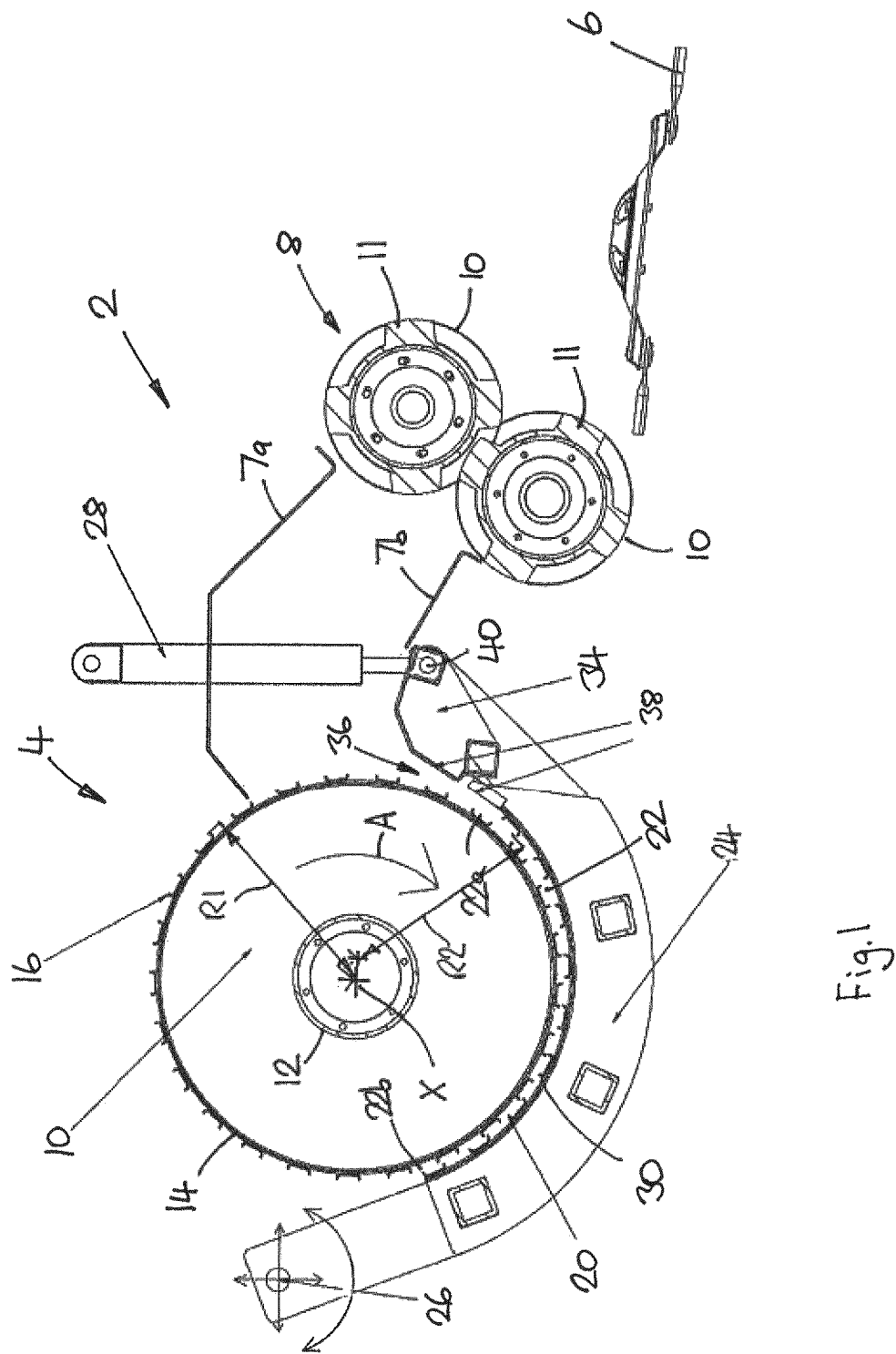
FIG. 1 is a side view of an agricultural machine that includes a plant processing apparatus (also referred to herein as an excoriation apparatus) according to a first embodiment.
Figures 2, 2A:
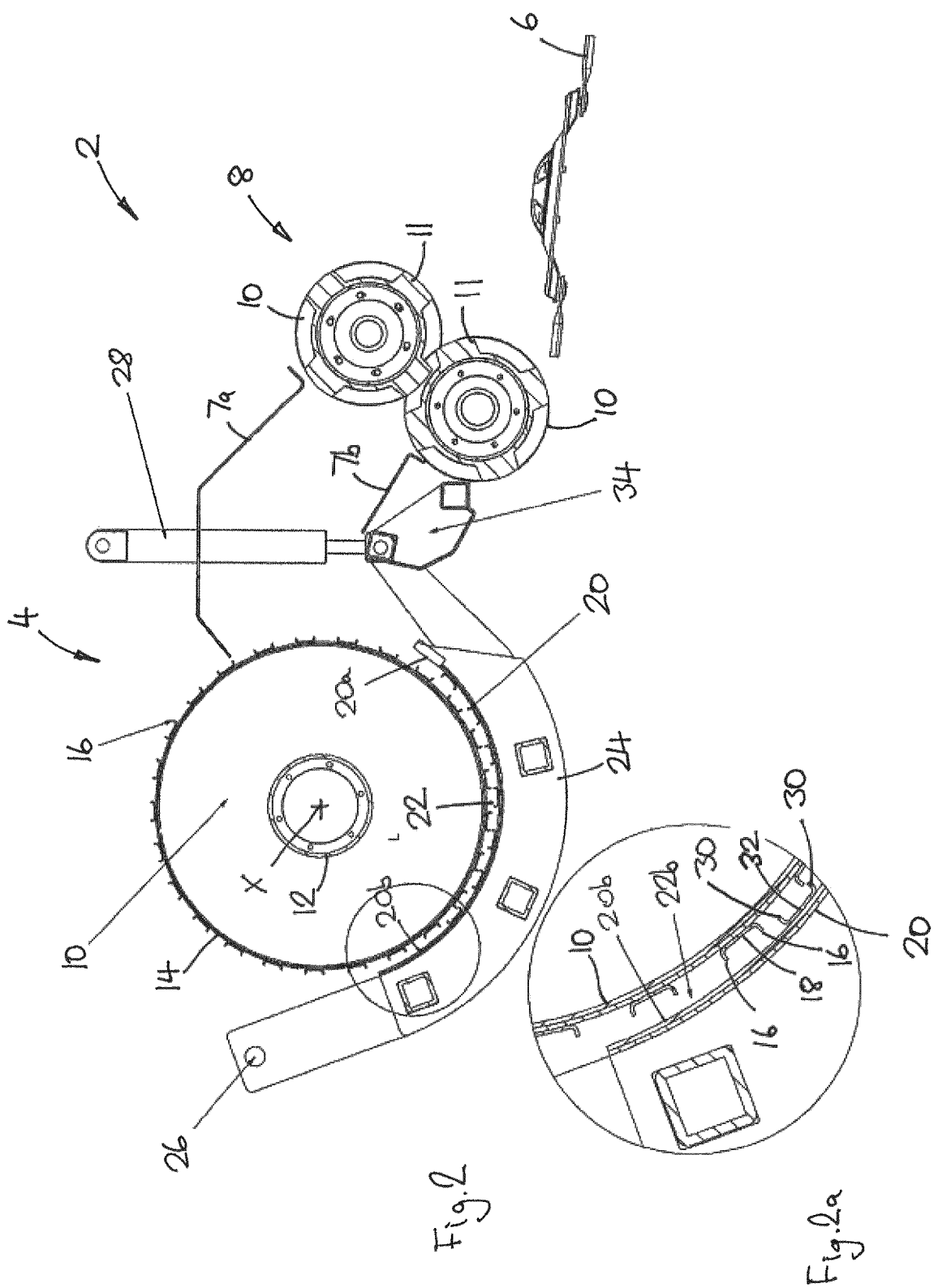
FIG. 2 is a side view of the agricultural machine shown in FIG. 1, with the excoriation apparatus in a second configuration.
FIG. 2a is a side view showing a portion of the agricultural machine shown in FIG. 2 at an enlarged scale.

The agricultural machine 2 shown in FIGS. 1, 2, 2a and 4 comprises a mowing machine for mowing grass and similar crops, which includes an excoriation apparatus 4 (or "plant processing apparatus") for processing the cut plant material (or "biomass") so that the processed plant material is suitable for use as a source of biofuel or as an animal feed. In a specific embodiment, the excoriation apparatus 4 treats the cut plant material to make it suitable for biodegradation in a biogas reactor.

In this embodiment the mowing machine 2 also includes a set of rotary cutters 6 (only one rotary cutter being shown), upper and lower guide plates 7a, 7b and a roller conditioner 8 comprising a pair of counter-rotating rollers 10 with interleaved crushing formations 11. The rotary cutters 6 and the roller conditioner 8 are conventional and they will not therefore be described in further detail. The rotary cutters 6 are configured to cut an agricultural crop, for example grass, and the roller conditioner 8 then feeds the cut plant material between the guide plates 7a, 7b to the excoriation apparatus 4 for further processing. While feeding the plant material, the roller conditioner 8 conditions the plant material by bruising and bending the stalks of grass. The conditioning process does not however have any effect on the biodegradability of the plant material.

The excoriation apparatus 4 includes a cylindrical drum 10 that is mounted for rotation about a drum axis X. A rotary drive 12 is provided for rotating the drum 10 in the direction indicated by arrow A. The drum 10 includes on its cylindrical surface 14 a plurality of working elements 16. In this embodiment the working elements 16 comprise U-shaped channel sections 18 that are attached to the cylindrical surface 14 of the drum so that each channel section 18 provides two working elements 16 (see FIG. 2a) that extend substantially radially from the surface of the drum 10. The working elements 16 may alternatively take other forms, as described below. The working elements 16 extend helically around the drum 10 as shown in FIG. 4, and in this embodiment comprise two opposite handed helix portions 16a, 16b, which are positioned at opposite ends of the drum 10. The working elements 16a, 16b are thus configured to draw the cut plant material towards the center of the drum 10 as the drum rotates, to form a swath.

The excoriation apparatus 4 also includes a part-cylindrical shell 20, which extends around part of the circumference of the cylindrical drum 10. In this embodiment the shell 20 is located beneath the drum 10 and extends around approximately one third of its circumference. The shell 20 is pressed towards the surface of the cylindrical drum 10, but it can be separated slightly from the drum by the flow of plant material to provide a processing channel 22 between the cylindrical surfaces of the drum 10 and the shell 20. This processing channel has an inlet end 22a into which plant material is fed by the roller conditioner 8, and an outlet end 22b from which processed plant material leaves the excoriation apparatus 4. As illustrated in FIG. 1, the inlet end 22a can be at a first circumferential position of the drum 10 and the outlet end 22b can be at a second circumferential position of the drum 10. The cut plant material is carried through the processing channel 22 from the inlet 22a to the outlet end 22b by rotation of the drum 10 in the direction of arrow A (e.g., circumferentially). It may be noted that in this embodiment the excoriation apparatus has an undershoot configuration in which the cut plant material passes beneath the drum 10.

The shell 20 is supported by a frame 24, which is supported at one end by a pivot 26. This allows the shell 20 to pivot about a pivot point P towards and away from the drum 10 to accommodate the plant material in the processing channel 22. A pressing mechanism comprising an adjuster 28 is attached to the opposite end of the frame 24, allowing the pressing force applied to the shell 20 to be adjusted. In this embodiment the adjuster 28 comprises a hydraulic actuator. However, any other suitable adjuster may be used as an alternative. For example, a mechanical actuator or a spring could be used.

The pivot 26 is preferably adjustable, enabling the position of pivot point P to be adjusted both radially and tangentially relative to the drum, and allowing both the size and the shape of the processing channel 22 to be adjusted. Usually, the pivot point P will be located such that the cylindrical surface 14 of the drum 10 and the cylindrical surface of the shell 20 are non-coaxial, and preferably so that the radial size of the processing channel 22 decreases from the inlet end 22a to the outlet end 22b. This ensures that the cut plant material receives an increasing level of processing as it travels through the processing channel 22. The pivot point P is preferably located towards the end of the shell that is closer to the outlet end of the processing channel 22, so that the radial width of the processing channel 22 does not change as much at the outlet end 22b as it does at the inlet end 22a.

The cylindrical shell 20 includes on its inner surface a set of working elements 30. In this embodiment each working element 30 comprises a U-shaped channel section 32 that is attached to the cylindrical surface of the shell 20, so that each channel section 32 provides two working elements 30 (see FIG. 2a) that extend substantially radially from the surface of the shell 20. The working elements 30 may alternatively take other forms, as described below.

In this embodiment the working elements 30 extend longitudinally along the shell 20 from one end to the other. Alternatively, the working elements 30 may extend helically along the shell 20. In either case, the first set of working elements 16 on the drum 10 and the second set of working elements 30 on the shell 20 are preferably set at different helix angles so that the two sets of working elements cross over one another. Consequently, the nip between adjacent working elements moves along the length of the working elements 16, 30 as the drum 10 rotates.

In the embodiment described above, the drum 10 is provided with helical working elements 16 and the shell 20 has working elements 30 that extend longitudinally, i.e. the working elements 30 lie in a plane that passes through the longitudinal axis of the cylindrical shell. Alternatively, the drum 10 may carry longitudinal working elements 16 while the shell 20 is provided with helical working elements 30.

Expressed more generally, it may be said that the drum 10 and the shell 20 each include a set of helical working elements 16, 30 where each set of helical working elements has a different helix angle. As a result, the two sets of working elements 16, 30 cross over one another. In the special case where the working elements extend longitudinally along the respective supporting surface (i.e. the drum 10 or the shell 20), these working elements may be regarded as being helical but with a helix angle of 0°. Preferably, each set of helical working elements 16, 30 has a helix angle in the 0° to 35°.

The cylindrical drum 10 has an effective radius R1, measured to the tips of the working elements 16, and the part-cylindrical shell 20 has a second effective radius R2, measured to the tips of the working elements 30, where R2 is greater than R1. Typically, R1 is in the range 30-100 cm, preferably 40-60 cm, and R2–R1 is in the range 0-20 cm, preferably 5-15 cm. As stated previously, the drum 10 and the shell 20 are preferably non-coaxial so that the radial width of the processing channel 22 as measured between the tips of the working elements 16, 30 decreases from the inlet end 22a to the outlet end 22b of the processing channel 22. For example, the width may typically decrease from about 10 cm at the inlet end 22a to about 0 cm at the outlet end 22b. Preferably, the tips of the working elements 16, 30 are pressed into contact with one another at, or close to, the outlet end 22b of the processing channel 22 when there is no plant material in the processing channel. Alternatively, a mechanical stop (not shown) may be provided, which limits movement of the shell 20 towards the drum 10 to maintain a small gap between the working elements 16, 30.

Optionally, the excoriation apparatus includes a trap device 34 located adjacent the feed gap 36 upstream of the inlet end 22a of the processing channel. In this embodiment the trap device 34 comprises a spring loaded pivotable plate 38 mounted on pivot 40, which can be pushed away from the drum 10 if a rock or other large object is fed into the gap between the drum 10 and the trap device 34. If this happens, the trap device 34 opens to release the object so that it does not enter the processing channel 22. After releasing the object the stone trap 34 may be returned to its original position, either manually or by a bias spring (not shown), so that it continues to guide cut plant material into the processing channel 22. The trap device 34 is preferably pivotably mounted on the frame 24 so that it moves with the shell 20 as the position of the shell is adjusted relative to the drum 10. Alternatively, the trap device may be actuated by a hydraulic cylinder.

The guide plates 7a, 7b and the optional trap device 34 (if provided) form a funnel that guides the plant material into a feed gap 36 at the inlet end 22a of the processing channel 22.

A method of operating a mowing machine 2 will now be described. In use, plant material (e.g. grass) is cut by the rotary cutters 6 and fed by the roller conditioner 8 to the excoriation apparatus 4 and into the feed gap 36 at the inlet end 22a of the processing channel 22. After any rocks and other unwanted objects have been discharged through the stone trap 34 the plant material is fed into the inlet end 22a of the processing channel 22 and is then carried through the processing channel 22 by rotation of the drum 10.

As mentioned previously, the helical working elements 16 on the drum 10 are set at a different helix angle to the working elements 30 on the shell 20 so that the two sets of working elements cross over one another. As the drum 10 rotates the crossover points of the respective working elements move longitudinally along the drum towards its center, thereby drawing the plant material inwards away from the ends of the drum 10. As the two sets for working elements 16, 30 pass over one another they break the lignin in the surface of the straw-like plant material, but without chopping the plant material into pieces.

The radial width of the processing channel 22 as measured between the tips of the working elements 16, 30 decreases from the inlet end 22a to the outlet end 22b, so that as the plant material passes through the processing channel 22 it undergoes an increasing level of mechanical treatment to break the lignin more thoroughly. At the outlet end 22b of the processing channel 22 the tips of the working elements 16, 30 are preferably pressed against each other in the absence of any plant material in the processing channel 22, so that the sets of working elements slide over one another in a scissor-like fashion.

When plant material is present in the processing channel 22 the plant material forces the drum 10 and the shell 20 apart slightly to leave a small gap between the tips of the adjacent working elements 16, 30 at the outlet end 22b of the processing channel 22. The working elements 16, 30 do not therefore cut the plant material into pieces, but subject the surfaces of the plant material to intense mechanical working, to break up the lignin in the surface. The pressure applied to the plant material by the working elements 16, 30 can be controlled by adjusting the force applied to the shell frame 24 by the actuator 28. The level of mechanical working can also be controlled by adjusting the radial and/or axial positions of the pivot 26, to control the shape of the processing channel 22.

When the plant material reaches the outlet end 22b of the processing channel 22 it is discharged from the excoriation apparatus by continued rotation of the drum 10. The working elements 30 may optionally be omitted from the shell 20 in an outlet portion 22b of the shell, to aid the discharge of processed plant material. The discharged plant material may be fed to a baler machine or a loader wagon, or alternatively it may be discharged onto the ground as a swath.

A second embodiment of the disclosure is shown in FIGS. 3 and 3a. In this embodiment the agricultural machine 2 is similar to the first embodiment described above, except that the lower guide plate 7b and the stone trap 34 are omitted and instead a guide/feed roller 44 is provided upstream of the inlet end 22a of the processing channel 22 of the excoriation apparatus 4. The guide/feed roller 44 has a set of feed plates 46 on its surface which rotate with the roller 44 to guide and feed plant materials from the rotary cutters 6 and the roller conditioner 8 to the excoriation apparatus 4 and into the feed gap 36 upstream of the inlet end 22a of the processing channel 22. A scraper device 47 extends from the inlet end of the shell 20 towards the guide/feed roller 44 to scrape off any plant materials that become attached to the guide/feed roller 44.

In this embodiment, working elements 30 are only provided in a central portion of the shell 20 between the inlet end 22a and the outlet end 22b. The shell 20 includes an inlet portion 20a on which optionally no working elements are provided, so that cut plant material can be fed readily into the processing channel 22 without blockages being formed. The shell 20 also includes an outlet portion 20b adjacent the outlet end 22b on which optionally no working elements 30 are provided, so that the processed plant material accelerates through this portion of the processing channel 22 towards the outlet end 22b.

Figure 5:
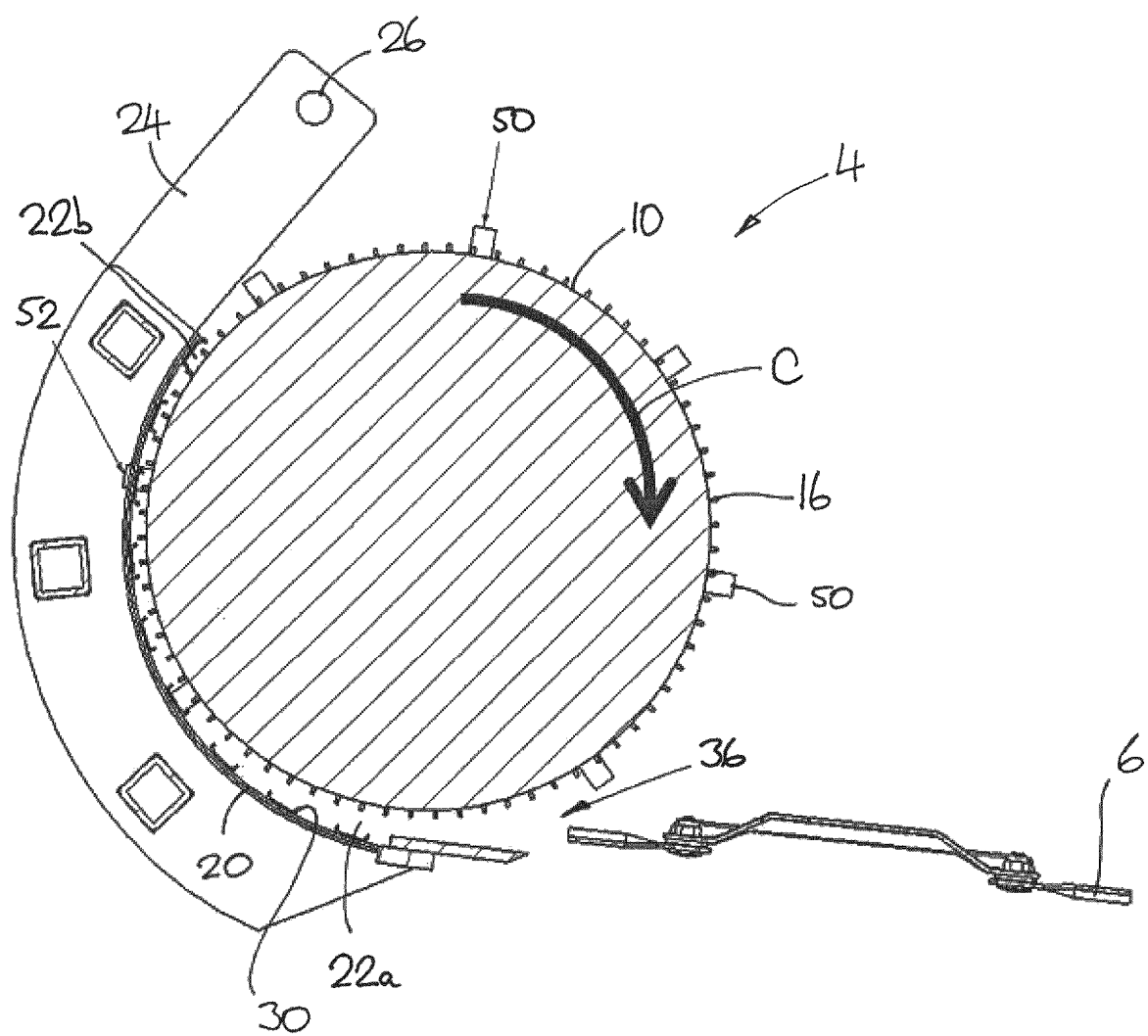
FIG. 5 is a side view of an agricultural machine that includes an excoriation apparatus according to a third embodiment.

A third embodiment of the disclosure is shown in FIG. 5. In this embodiment of the agricultural machine 2 the roller conditioner is omitted and the cutter bar (not shown), which carries the rotary cutters 6, is mounted close to the feed gap 36 at the inlet end 22a of the processing channel 22, to feed cut plant material directly to the excoriation apparatus 4. The position of the shell 20 is also different in this embodiment, the shell 20 being mounted to the rear of the drum 10 in the travelling direction so that the processing channel 22 extends from an inlet end 22a beneath the drum 10 to an outlet end 22b that is positioned behind the drum 10 at a height between the axis of the drum and its upper extremity. The drum 10 and the shell 20 carry working elements 16, 30 as previously described. The shell 10 is mounted on a pivot 26 and it is pressed towards the drum 10 by a pressing mechanism (not shown) as previously described.

In this embodiment the drum 10 is provided with optional carrier plates 50 (also called "drive elements") that rotate with the drum 10 and extend radially outwards beyond the tips of the drum working elements 16. Optional slots 52 are provided in the shell 20 to accommodate the carrier plates 50 as the drum 10 rotates.

In use, the drum 10 rotates about its axis in the direction of arrow C (clockwise in FIG. 5). Cut plant material is fed by the rotating cutters 6 into the feed gap 36, where it is gathered together by the rotating carrier plates 50 and carried into the inlet end 22a of the processing channel 22. The cut plant material is then processed in the processing channel 22 by the working elements 16, 30 as described above in relation to the first embodiment, before being discharged from the outlet end of the processing channel 22.

It should be noted that in this embodiment the excoriation apparatus 4 again has an undershoot configuration, in which the processed material passes beneath the drum 10.

Figure 6:
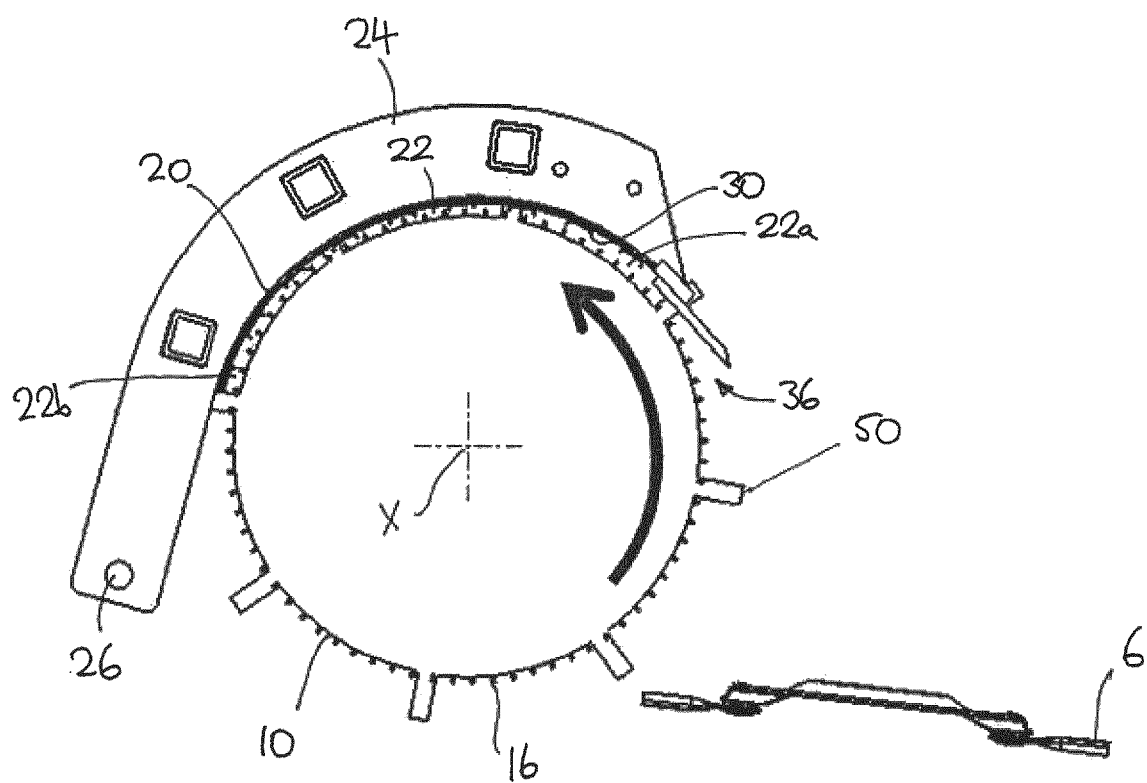
FIG. 6 is a side view of an agricultural machine that includes an excoriation apparatus according to a fourth embodiment.

A fourth embodiment of the disclosure is shown in FIG. 6. In this embodiment the agricultural machine 2 is similar to the third embodiment shown in FIG. 5 except that the excoriation apparatus 4 has an overshoot configuration in which the cut plant material passes over the top of the drum 10. The shell 20 is inverted as compared to the third embodiment and extends upwards from a pivot 26 located behind the drum 10 and below the drum axis X to the feed gap 36, which is located in front of the drum 10 at a height between the drum axis X and the upper extremity of the drum. The shell 20 provides a processing channel 22 through which plant material is carried from an inlet end 22a to an outlet end 22b. The drum 10 and the shell 20 are provided with working elements 16, 30 as described previously and the shell 20 is pressed towards the drum 10 as described previously by a pressing mechanism or actuator (not shown) attached for example to the free end of the shell 20. The position of the shell 20 relative to the drum 10 can also be adjusted by adjusting the position of the pivot 26 relative to the drum axis X.

Figure 7:
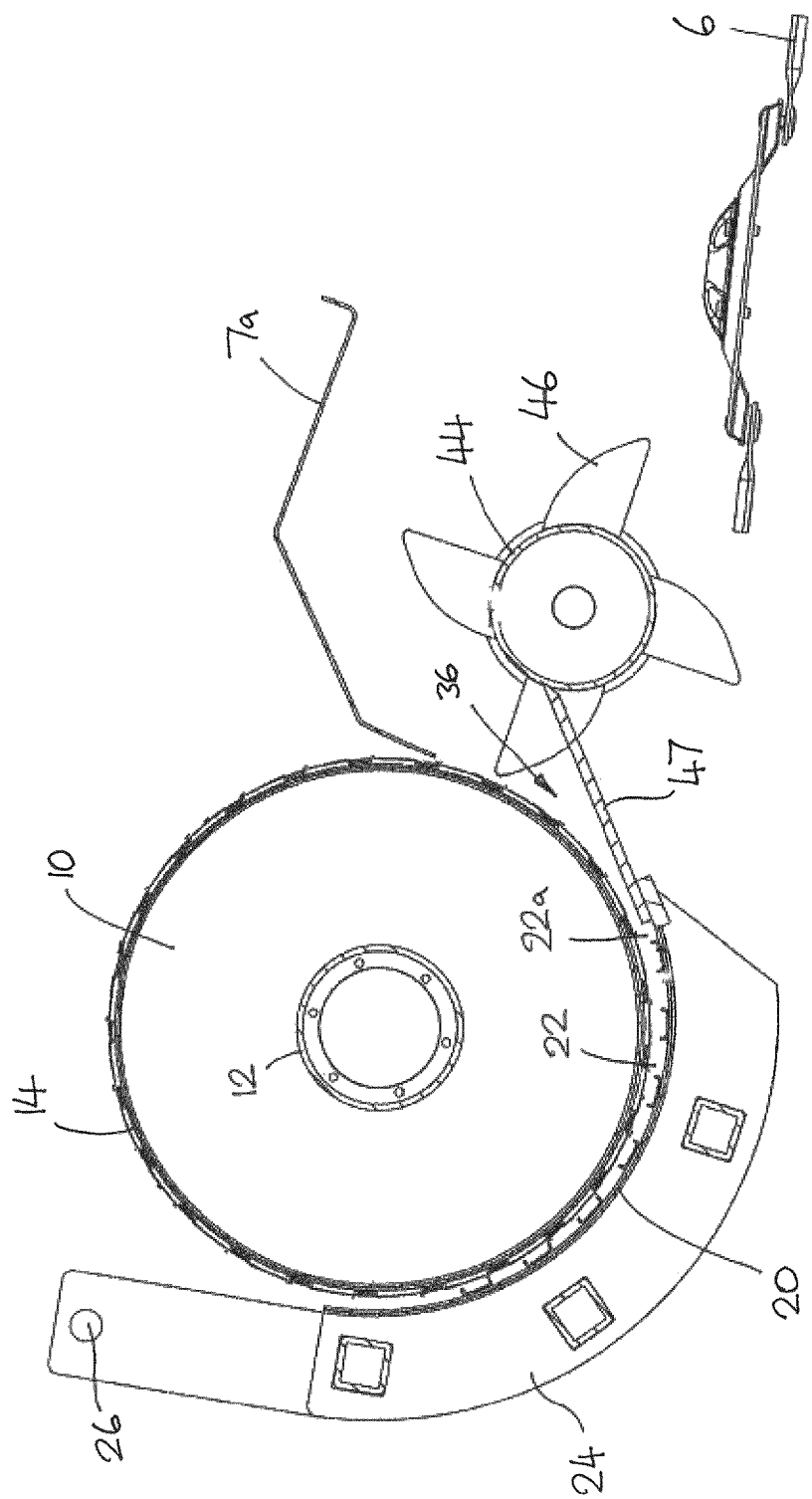
FIG. 7 is a side view of an agricultural machine that includes an excoriation apparatus according to a fifth embodiment.
Figure 8:
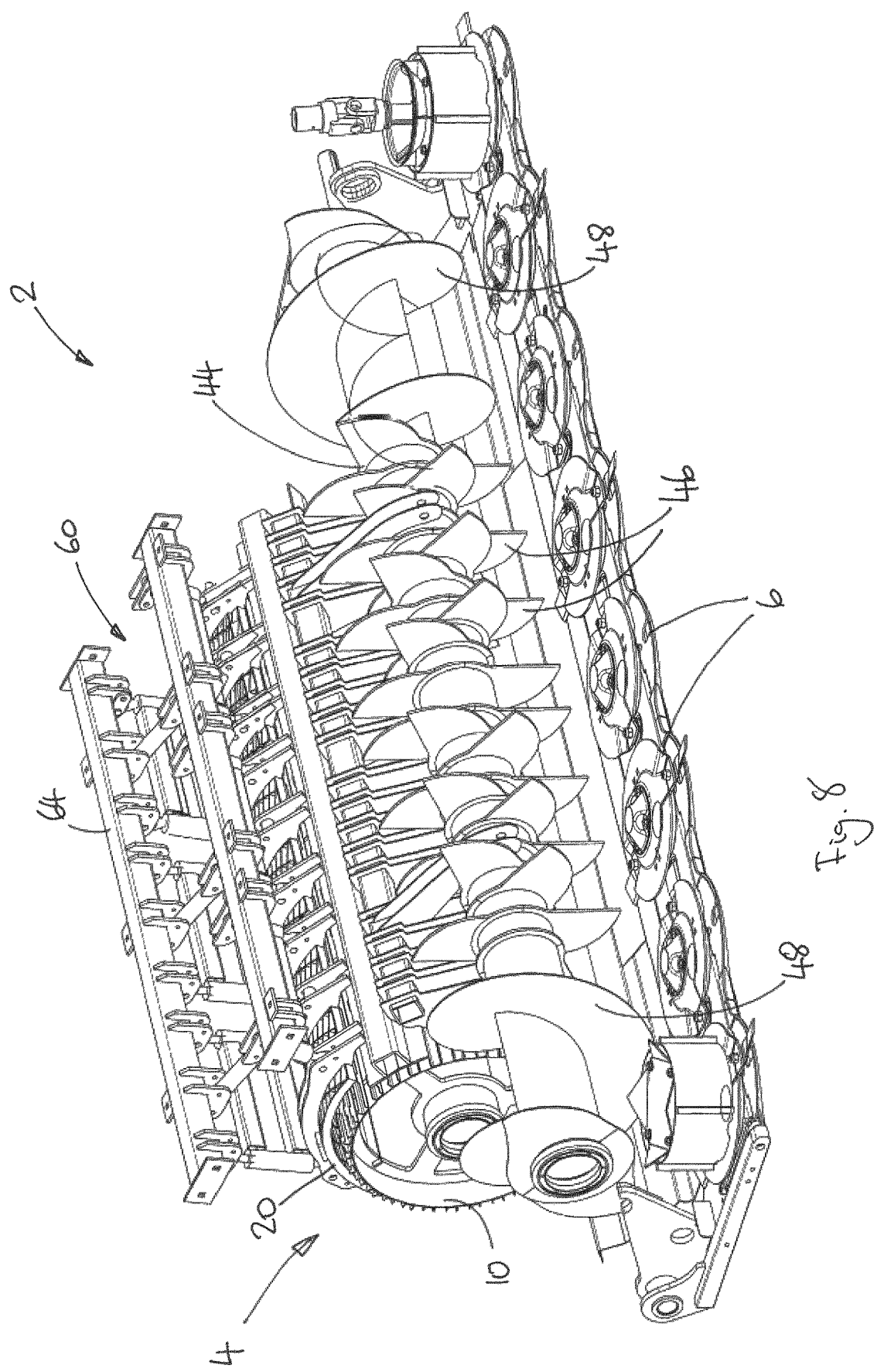
FIG. 8 is an isometric front view of an agricultural machine that includes an excoriation apparatus according to a sixth embodiment.
Figure 9:
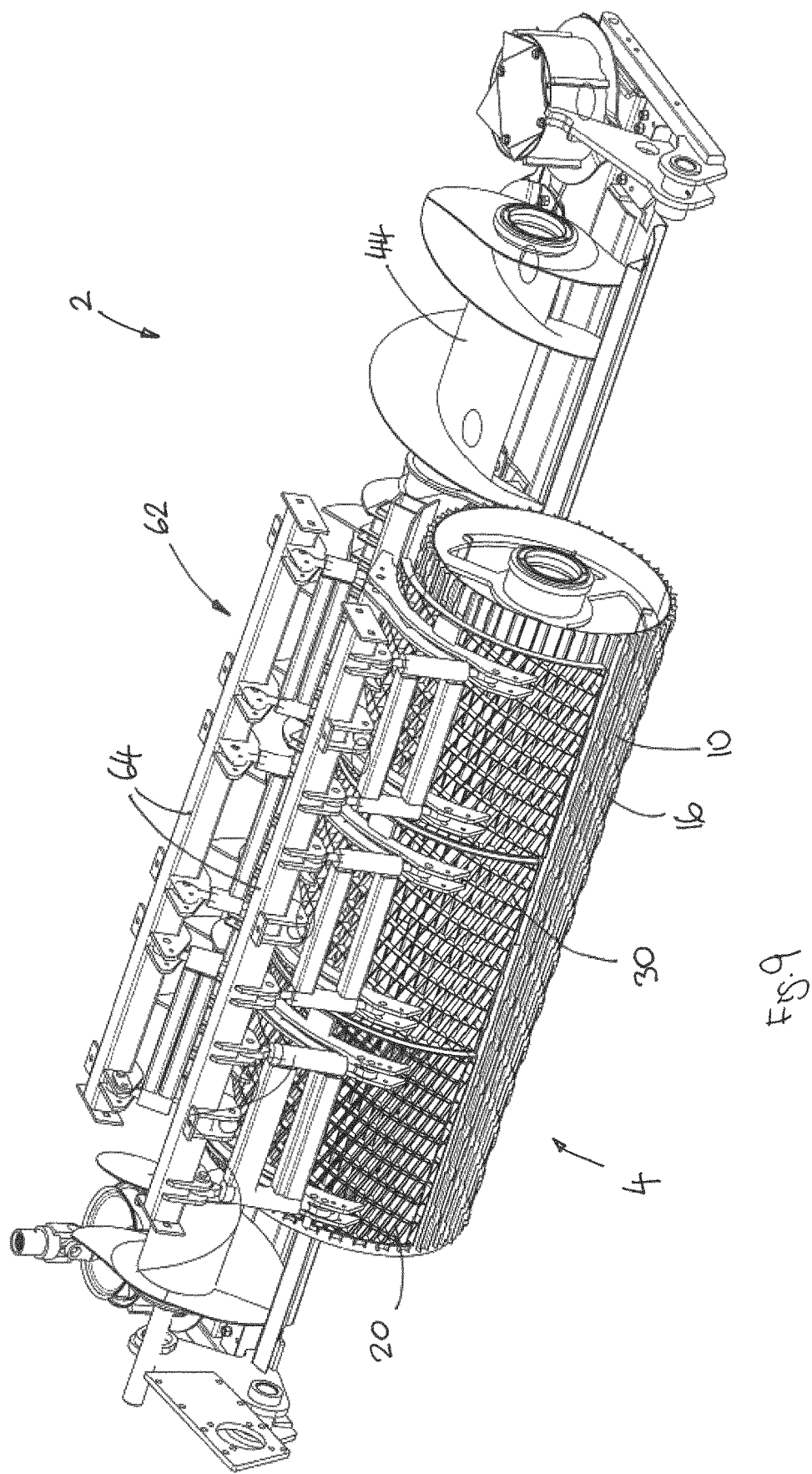
FIG. 9 is an isometric rear view of the agricultural machine shown in FIG. 8, and FIGS. 10 and 11 are side views of the agricultural machine shown in FIG. 8 in two different configurations.

A fifth embodiment of the disclosure is shown in FIG. 7. In this embodiment the agricultural machine 2 is similar to the second embodiment shown in FIGS. 3 and 3a, except that the roller conditioner 8 has been omitted. A guide/feed roller 44 is provided upstream of the inlet end 22a of the processing channel 22 of the excoriation apparatus 4. The guide/feed roller 44 has a set of feed plates 46 on its surface which rotate with the roller 44 to guide and feed plant materials from the rotary cutters 6 into the feed gap 36 upstream of the inlet end 22a of the processing channel 22. In all other respects the agricultural machine 2 of this embodiment is similar to the second embodiment described above.

A sixth embodiment of the disclosure is shown in FIGS. 8 to 11. In this embodiment the agricultural machine 2 comprises a mowing machine that includes a set of rotary cutters 6, a guide/feed roller 44 and an excoriation apparatus 4 comprising a cylindrical drum 10 and a part-cylindrical shell 20, which extends around an upper part of the circumference of the cylindrical drum 10. In this embodiment a guide/feed roller 44 is configured to pick up cut plant material from the cutters 6 and transfer it to the drum 10, which has an overshoot configuration, the direction of rotation of a guide/feed roller 44 and the drum 10 being indicated in FIG. 10 by arrows C, D. A guide plate 55 located beneath the guide/feed roller 44 helps to guide the cut plant material from the cutters 6 to the drum 10.

In this embodiment the guide/feed roller 44 has a set of feed plates 46 on its surface which rotate with the roller 44 to guide and feed plant materials from the rotary cutters 6 to the excoriation apparatus 4. At each end of the guide/feed roller 44 a helical auger flight 48 is provided, which draws plant material inwards towards the center of the guide/feed roller 44 as it rotates.

A trap device (not shown) is optionally located between the guide/feed roller 44 and the drum, which can be opened to release a rock or similar object thrown up by the cutters 6. The trap device may be actuated manually or by a bias spring or a hydraulic cylinder.

In this embodiment the shell 20 is divided lengthwise into three sections, each section being supported at either end by a suspension system 60 that includes a pair of connecting rods 62a, 62b, each connecting rod being pivotally connected at one end to the shell 20 and at the other end to the frame 64 of the mower. The connecting rods 62a, 62b, the shell 20 and the frame 64 form a four-bar linkage, which allows the shell 20 to rotate about a pivot point P located to the rear of the drum axis X. A pressing mechanism comprising a hydraulic cylinder 66, which acts as a variable spring, is provided to allow movement of the shell 20 relative to the drum 10 in response to the flow of plant material through the excoriation apparatus 4. Optionally, each connecting rod 62a, 62b may be adjustable in length (for example, each connecting rod may comprise a turnbuckle or a hydraulic cylinder), providing further control over the position and orientation of the shell 20 relative to the drum 10.

The shell 20 is pressed towards the surface of the cylindrical drum 10 by the hydraulic cylinder 66, but can be separated slightly from the drum by the flow of plant material through the excoriation apparatus 4 to provide a processing channel 22 between the cylindrical surfaces of the drum 10 and the shell 20. This processing channel 22 has an inlet end 22*a* into which plant material is fed by a guide/feed roller 44, and an outlet end 22*b* from which processed plant material leaves the excoriation apparatus 4. The cut plant material is carried through the processing channel 22 from the inlet 22*a* to the outlet end 22*b* by rotation of the drum 10 in the direction of arrow D.

Figure 10:
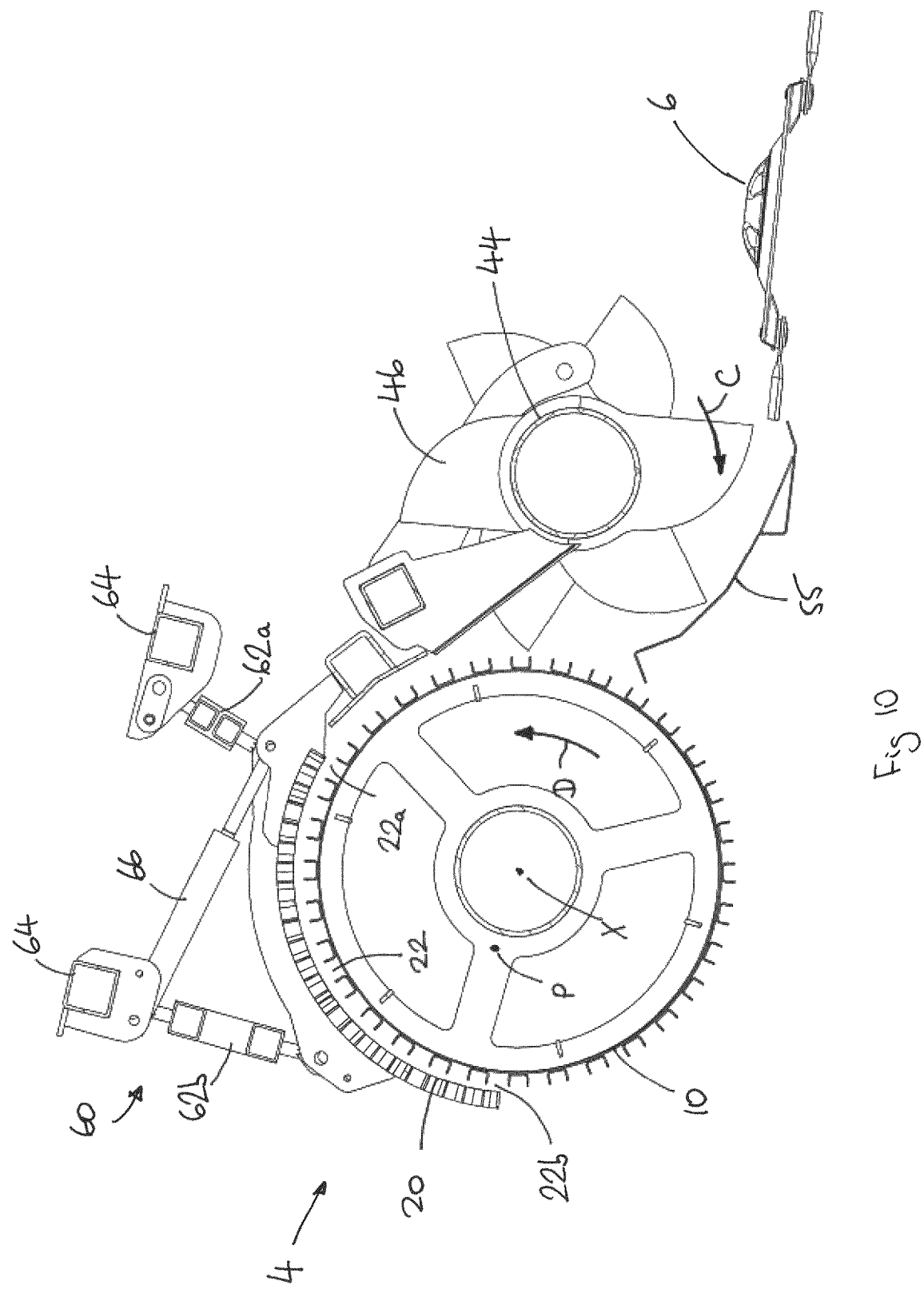
Figure 11:
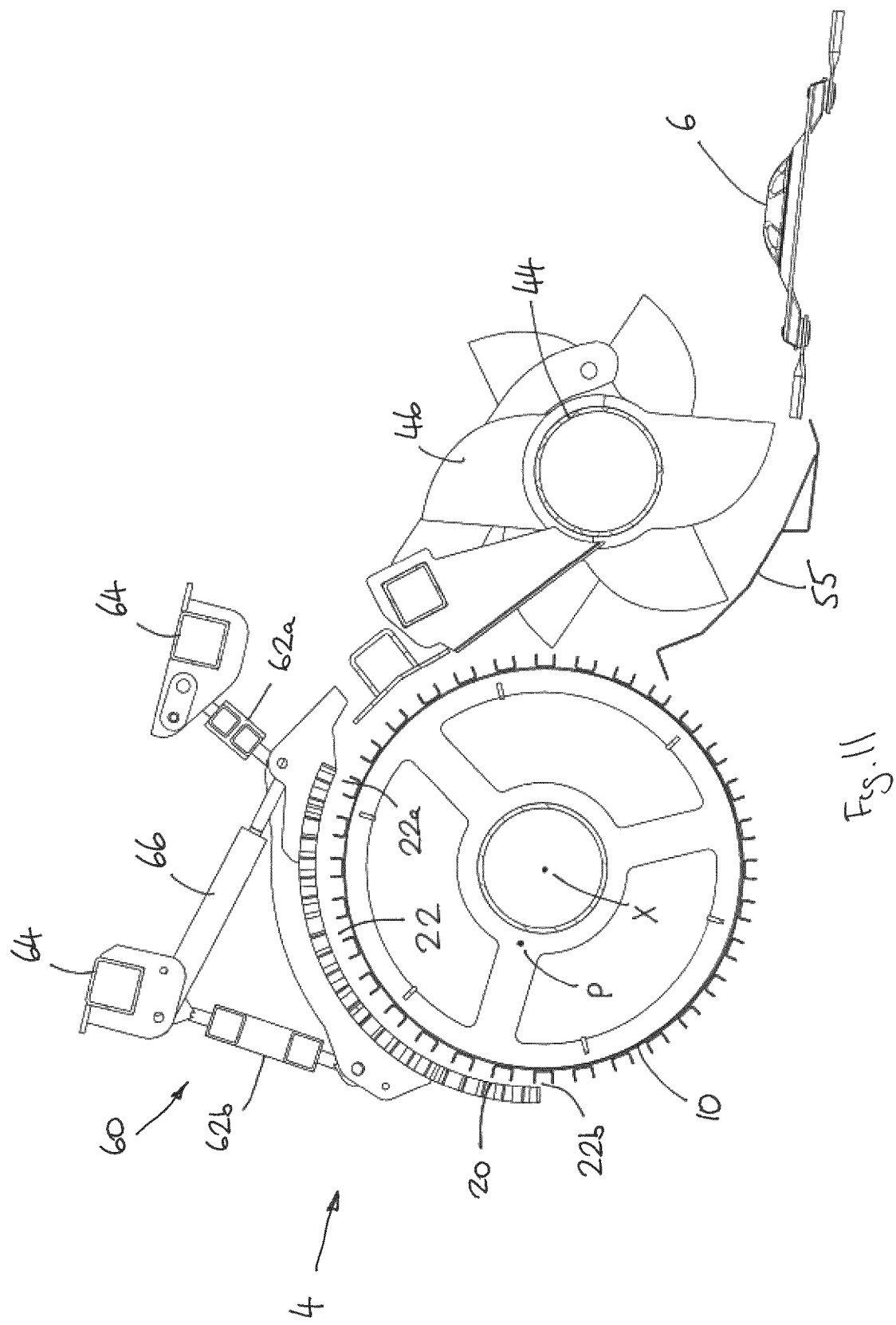

The connecting rods 62*a*, 62*b* are preferably adjustable, enabling the position of pivot point P to be adjusted both radially and tangentially relative to the drum, and thereby allowing both the size and the shape of the processing channel 22 to be adjusted. Usually, the pivot point P will be located such that the cylindrical surface 14 of the drum 10 and the cylindrical surface of the shell 20 are non-coaxial, and preferably so that the radial size of the processing channel 22 decreases from the inlet end 22*a* to the outlet end 22*b*. This ensures that the cut plant material receives an increasing level of processing as it travels through the processing channel 22. In FIG. 10 the shell 20 is shown in a first position in which the radial size of the processing channel 22 decreases slightly from the inlet end 22*a* to the outlet end 22*b*. In FIG. 11 the shell 20 is shown in a second position in which the flow of plant material through the processing channel has caused the shell 20 to rotate anticlockwise relative to the drum 10, which causes the radial size of the processing channel 22 to decrease more rapidly from the inlet end 22*a* to the outlet end 22*b*.

The drum 10 includes on its cylindrical surface a plurality of working elements 16. In this embodiment the working elements 16 comprise U-shaped channel sections that are attached to the cylindrical surface of the drum so that each channel section provides two working elements 16 that extend substantially radially from the surface of the drum 10. The working elements 16 may alternatively take other forms. In this embodiment the working elements 16 extend longitudinally along the drum 10 (i.e. at a helix angle of 0°).

The cylindrical shell 20 includes on its inner surface a set of working elements 30. In this embodiment the working elements 30 extend helically along the shell 20 at a helix angle in the range 0° to 35°, typically about 30°. The first set of working elements 16 on the drum 10 and the second set of working elements 30 on the shell 20 are therefore set at different helix angles so that the two sets of working elements cross over one another. Consequently, the nip between adjacent working elements moves along the length of the working elements 16, 30 as the drum 10 rotates. Preferably, each set of helical working elements 16, 30 has a helix angle in the range 0° to 35°.

Various modifications of the agricultural machines 2 described above are of course possible and will be readily apparent to a person skilled in the art. It should be understood therefore that the scope of protection is not intended to be restricted to the precise form of the embodiments of the agricultural machine described herein.

For example, the shell 20 may be non-cylindrical and it may instead have another curved shape, e.g. a parabolic, elliptical or involute shape. The shell 20 may also consists of a number of shell sections, which may be mounted on different pivots so as to be separately adjustable. Gaps may be provided between the sections allowing foreign objects to be ejected. The working elements 16, 30 may also take different forms. For example, the working elements 16, 30 may consist of roughened or profiled surfaces applied to the drum 10 and/or the shell 20. The surfaces may for example be made of expanded metal or checker plate. The surfaces of the drum 10 and the shell 20 may also be covered with barbs. This will produce a beneficial carding effect on the plant material. Alternatively, the surfaces of the drum 10 and the shell 20 may be designed to roll the plant material into small rolls, which makes collection and/or handling easier.

Figure 12:
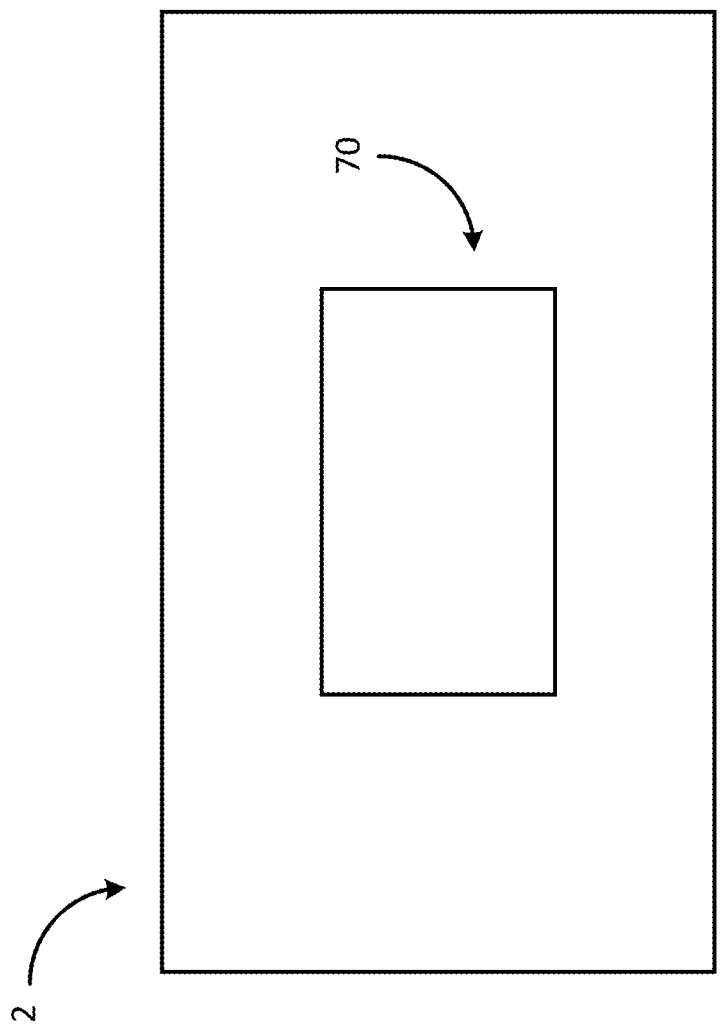
FIG. 12 is a block diagram schematically illustrating an agricultural machine that includes a baler.
Figure 13:
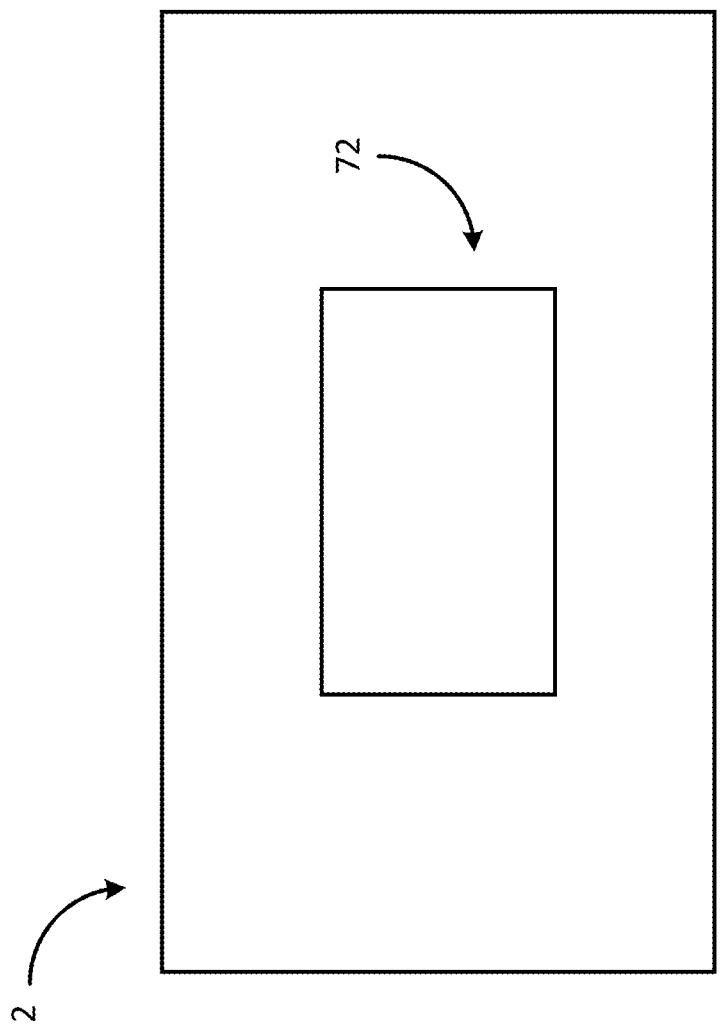
FIG. 13 is a block diagram schematically illustrating an agricultural machine that includes a loader wagon.

FIG. 12 illustrates the agricultural machine 2 including a baler 70 for baling the processed plant material. As stated above, the plant material discharged from, for example, an outlet portion 22*b* of the shell 20 can be fed to the baler. FIG. 13 illustrates the agricultural machine 2 including a loader wagon 72 for loading the processed plant material. As stated above, the plant material discharged from, for example, an outlet portion 22*b* of the shell 20 can be fed to the loader wagon.

Furthermore, it should be understood that features of the different embodiments described above may be combined in any suitable combination, subject as necessary to any essential modifications.

In particular, but not exclusively, it should be noted that although the excoriation apparatus is described above in combination with a mower apparatus, the excoriation apparatus could alternatively form part of another agricultural machine (for example, it could be part of a baling machine, a loader wagon or a feed mixer machine), or it could consist of a standalone machine, which could be designed to be either mobile (e.g. mounted on wheels) or stationary.

The invention claimed is:

1. An agricultural machine that includes a plant processing apparatus for processing plant material to facilitate the biodegradability or the digestibility of the plant material, the plant processing apparatus comprising:
   a cylindrical drum that is rotatable about a drum axis;
   a rotary drive configured to rotate the drum about the drum axis; and
   a curved shell that extends around at least part of the circumference of the drum,
   a processing channel between an outer surface of the cylindrical drum and an inner surface of the shell, said processing channel having an inlet end and an outlet end;
   the agriculture machine configured such that, in use, plant material is transported through the processing channel from the inlet end to the outlet end by rotation of the cylindrical drum; and
   a pressing mechanism,
   wherein the drum has an outer surface with a first set of working elements and the shell has an inner surface with a second set of working elements, said first and second sets of working elements being configured to excoriate the plant material as the plant material is fed through the processing channel; and
   wherein the relative positions of the shell and the drum are adjustable, wherein the shell is mounted on a suspension system that permits the shell to move towards and away from the drum, and wherein the pressing mechanism is configured to press the cylindrical drum and the curved shell towards one another.

2. An agricultural machine according to claim 1, wherein the width of the processing channel decreases from the inlet end to the outlet end.

3. An agricultural machine according to claim 2, wherein the shell is partially cylindrical and the cylindrical surfaces of the drum and the shell are non-coaxial.

4. An agricultural machine according to claim 1, wherein the suspension system is adjustable to permit the position of the shell to be adjusted radially and/or tangentially relative to the drum axis.

5. An agricultural machine according claim 1, wherein the pressing mechanism includes an adjustment mechanism for adjusting a pressing force.

6. An agricultural machine according to claim 1, wherein the first set of working elements comprises a first set of ribs that extend outwards from the cylindrical surface of the drum.

7. An agricultural machine according to claim 6, wherein the second set of working elements comprises a second set of ribs that extend inwards from the curved surface of the shell.

8. An agricultural machine according to claim 7, wherein the first set of ribs are arranged helically on the surface of the drum with a helix angle in the range 0° to 35°.

9. An agricultural machine according to claim 8, wherein the second set of ribs are arranged helically on the surface of the shell with a helix angle in the range 0° to 35°.

10. An agricultural machine according to claim 9, wherein the first and second sets of working elements are at different helix angles.

11. An agricultural machine according to claim 1, wherein the shell includes an inlet portion adjacent the inlet end that has no working elements.

12. An agricultural machine according to claim 1, wherein the shell has an outlet portion adjacent the outlet end that has no working elements.

13. An agricultural machine according to claim 1, wherein the drum includes drive elements that extend radially outwards beyond the working elements.

14. An agricultural machine according to claim 13, wherein the shell includes a plurality of slots that accommodate the drive elements during rotation of the drum.

15. An agricultural machine according to claim 1, further comprising a feed roller that feeds plant material into the processing channel.

16. An agricultural machine according to claim 1, further comprising a trap device located adjacent the inlet end of the processing channel.

17. An agricultural machine according to claim 1, further comprising a harvesting mechanism for harvesting a plant material and feeding the plant material to the plant processing apparatus.

18. An agricultural machine according to claim 17, wherein the harvesting mechanism includes a plurality of rotating cutters.

19. An agricultural machine according to claim 17, wherein the harvesting mechanism includes a feed mechanism for feeding the cut plant material to the plant processing apparatus.

20. An agricultural machine according to claim 1 further comprising a baler for baling the processed plant material.

21. An agricultural machine according to claim 1, wherein the agricultural machine further comprises a loader wagon for loading the processed plant material.

22. An agricultural machine according to claim 1, wherein:
the processing channel extends around at least part of the circumference of the drum;
the inlet end of the processing channel is located at a first circumferential position;
the outlet end of the processing channel is located at a second circumferential position; and
the agriculture machine is configured such that, in use, plant material is transported circumferentially through the processing channel from the inlet end to the outlet end by rotation of the cylindrical drum.

23. An agricultural machine according to claim 1, wherein the inlet end comprises a feed gap that is tangential to the cylindrical drum, the agriculture machine configured such that, in use, plant material enters the processing channel through the feed gap.

24. An agricultural machine according to claim 1, further comprising a feed roller configured to feed plant material into the inlet end of the processing channel, the feed roller positioned radially outward and rearward of the cylindrical drum.

* * * * *